(12) United States Patent
DeVor et al.

(10) Patent No.: US 8,561,508 B2
(45) Date of Patent: Oct. 22, 2013

(54) HARD TURNING MICRO-MACHINE TOOL

(75) Inventors: Richard E. DeVor, Champaign, IL (US); Kurt Adair, Arlington Heights, IL (US); Shiv G. Kapoor, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 827 days.

(21) Appl. No.: 12/760,746

(22) Filed: Apr. 15, 2010

(65) Prior Publication Data

US 2011/0252930 A1    Oct. 20, 2011

(51) Int. Cl.
*B23B 5/00* (2006.01)
*B23B 1/00* (2006.01)

(52) U.S. Cl.
USPC ............................................ 82/1.11; 82/158

(58) Field of Classification Search
USPC ........... 82/1.11, 158, 161; 409/201, 211, 216, 409/226
See application file for complete search history.

(56) References Cited

U.S. PATENT DOCUMENTS

| | | | |
|---|---|---|---|
| 2,397,545 A | 4/1946 | Hardinge | |
| 2,585,990 A | 2/1952 | Baldenhofer | |
| 2,633,763 A * | 4/1953 | Sperling | ......................... 269/49 |
| 2,636,321 A | 4/1953 | Wilson | |
| 2,714,823 A | 8/1955 | Dall et al. | |
| 3,167,891 A | 2/1965 | Coes, Jr. et al. | |
| 3,522,864 A | 8/1970 | Richter | |
| 3,524,283 A | 8/1970 | Jones | |
| 3,543,502 A | 12/1970 | Ratti | |
| 3,553,893 A | 1/1971 | Stade | |
| 3,653,855 A | 4/1972 | Smith | |
| 3,717,392 A | 2/1973 | Ennis | |
| 3,966,347 A | 6/1976 | Watson | |
| 4,466,601 A * | 8/1984 | Raines | ............................ 269/79 |
| 4,590,578 A | 5/1986 | Barto, Jr. et al. | |
| 4,967,947 A | 11/1990 | Sarh | |
| 5,028,180 A * | 7/1991 | Sheldon et al. | ............... 409/201 |
| 5,033,340 A | 7/1991 | Siefring | |
| 5,071,503 A | 12/1991 | Berman | |
| 5,104,237 A | 4/1992 | Slocum | |
| 5,249,785 A | 10/1993 | Nelson et al. | |
| 5,401,128 A | 3/1995 | Lindem et al. | |

(Continued)

FOREIGN PATENT DOCUMENTS

EP    1183121    5/2000

OTHER PUBLICATIONS

U.S. Appl. No. 12/877,863, filed Sep. 8, 2010, Kapoor et al.

(Continued)

*Primary Examiner* — Will Fridie, Jr.
(74) *Attorney, Agent, or Firm* — Greer, Burns & Crain Ltd.

(57) ABSTRACT

A micro-scale apparatus for supporting a tool for hard turning comprises a base, a pivot coupled to the base, an actuator coupled to the base, and at least one member coupled to the actuator at one end and rotatably coupled to the pivot at another end. A tool mount is disposed on the at least one member. The at least one member defines a first lever arm between the pivot and the tool mount, and a second lever arm between the pivot and the actuator. The first lever arm has a length that is less than a length of the second lever arm. The actuator moves the tool mount along an arc.

20 Claims, 11 Drawing Sheets

(56) References Cited

U.S. PATENT DOCUMENTS

| | | | |
|---|---|---|---|
| 5,405,222 A * | 4/1995 | Ward | 409/201 |
| 5,538,373 A * | 7/1996 | Kirkham | 409/131 |
| 6,041,500 A * | 3/2000 | Terpstra | 29/889.21 |
| 6,733,365 B1 | 5/2004 | Shaw et al. | |
| 7,524,152 B2 | 4/2009 | Honegger et al. | |

OTHER PUBLICATIONS

Abrao, Alexandre M., et al., "The surface integrity of turned and ground hardened bearing steel," Wear 196 (1996): 279-284.

Adair, Kurt, et al., "Development of a Unique Topology for a Hard-Turning Micro-Scale Machine Tool," 2009.

Agha, Salah R., et al., "Experimental study on the performance of superfinish hard turned surfaces rolling contact," Wear 244 (2000): 52-59.

Altintas, Y., et al., "A Piezo Tool Actuator for Precision Turning of Hardened Shafts," CIRP Ann., vol. 51, No. 1, pp. 303-306, 2002.

Boggio, U., "The recipe for good hard turning," Manufacturing Engineering, Mar. 1996, vol. 116, Iss. 3, p. 95.

Chou, Y. Kevin, et al, "Experimental investigation on CBN turning of hardened AISI 52100 steel," Journal of Materials Processing Technology 124 (2002) 274-283.

Honegger, A., et al., "A Hybrid Methodology for Kinematic Calibration of Micro/Meso-Scale Machine Tools (mMTs)," Journal of Manufacturing Science and Engineering, 2006: 513-522.

Kapoor, S.G., et al., "Current State of Micro Scale Machine Tool Systems and Machining Research," Workshop on MicroManufacturing, Urbana, 2004.

Matsumoto, Y., et al., "Surface Integrity Generated by Precision Hard Turning", Annals of the CIRP, vol. 48, 1999: 59-62.

Phillip, A.G., et al., "A new acceleration-based methodology for micro/meso-scale machine tool performance evaluation," International Journal of Machine Tools & Manufacture 46, 2006: 1435-1444.

Sawada, K., et al., "Development of Ultraprecision Machining Center with Closed-Loop Structure and its Control," Annals of the CIRP, 1995, 369-372.

Shaw, M.C., et al., "The Mechanism of Chip Formation with Hard Turning Steel," Annals of the CIRP, vol. 47, 1998: 77-82.

Sheehy, T. "Taking the Hard Out of Hard Turning," Manufacturing Engineering, Mar. 1997: 100-106.

Soroka, D. P. "Building on Hard Turning," American Machinist, May 2004: 56-61.

Sukaylo, V.A., et al., "Development and verification of a computer model for thermal distortions in hard turning," Journal of Materials Processing Technology 155-156, 2004: 1821-1827.

\* cited by examiner

HARD TURNING MICRO-MACHINE TOOL

STATEMENT OF GOVERNMENT INTEREST

This invention was made with Government assistance under Grant No. Navy RD 2007-05449, issued by Office of Naval Research, and Grant Nos. DE-FG02-07DER46453 and DE-FG02-07ER46471, issued by U.S. Department of Energy. The Government has certain rights in the invention.

FIELD OF THE INVENTION

The invention relates generally to the field of micro-scale tools.

BACKGROUND OF THE INVENTION

Hard turning machines are becoming more common on a macro-scale, replacing traditional turning machine tools. At the micro-scale, hard turning machine tools employ methods for dampening vibration and increasing stiffness using conventional machine tool topologies. However, hard turning of miniature parts or components presents unique problems for micro-scale machines.

As a nonlimiting example, miniature bearings have been used for a wide range of applications from dental spindles to gyroscopes in missiles. Such bearings conventionally are made of hardened steel and produced on the same machines as large bearings, then finished on a grinder. This process is time consuming, and produces low yields of bearings with inconsistent life expectancies.

More recently, hard-turning has been shown to be a viable alternative. Hard-turning has the advantage of not requiring custom tooling for every part and creates a residual stress pattern at and below the surface favorable to bearing life. While miniaturizing hard turning machines could eliminate the need for grinding small bearings to a finish, problems arise as the size of the bearing components made on these machines reduces and the machine components shrink. For example, the dimensional accuracy requirement of a bearing feature is typically relative to its size. As the bearing becomes smaller the tolerances become tighter. The tolerances on these miniature bearings can easily reach 1 µm, pushing or exceeding the limits of traditional machines. Therefore, miniature bearings made on such machines may require selective assembly to meet tolerances. As a result, this can lead to low yields, particularly with small batch sizes common to miniature bearings.

Some previous designs using hard turning of miniature bearings using a micro-scale machine tool (mMT) have achieved good accuracy and surface finishes, but their processes have not been robust. For more stable cutting conditions for miniature bearings and other miniature parts, it is desired to provide a more rigid machine tool that improves both accuracy and surface roughness, while limiting problems such as chatter.

SUMMARY OF THE INVENTION

According to embodiments of the present invention, a micro-scale apparatus for supporting a tool for hard turning is provided. The apparatus comprises a base, a pivot coupled to the base, an actuator coupled to the base, and at least one member coupled to the actuator at one end and rotatably coupled to the pivot at another end. A tool mount is disposed on the at least one member. The at least one member defines a first lever arm between the pivot and the tool mount, and a second lever arm between the pivot and the actuator. The first lever arm has a length that is less than a length of the second lever arm. The actuator moves the tool mount along an arc.

DETAILED DESCRIPTION

Figure 1:
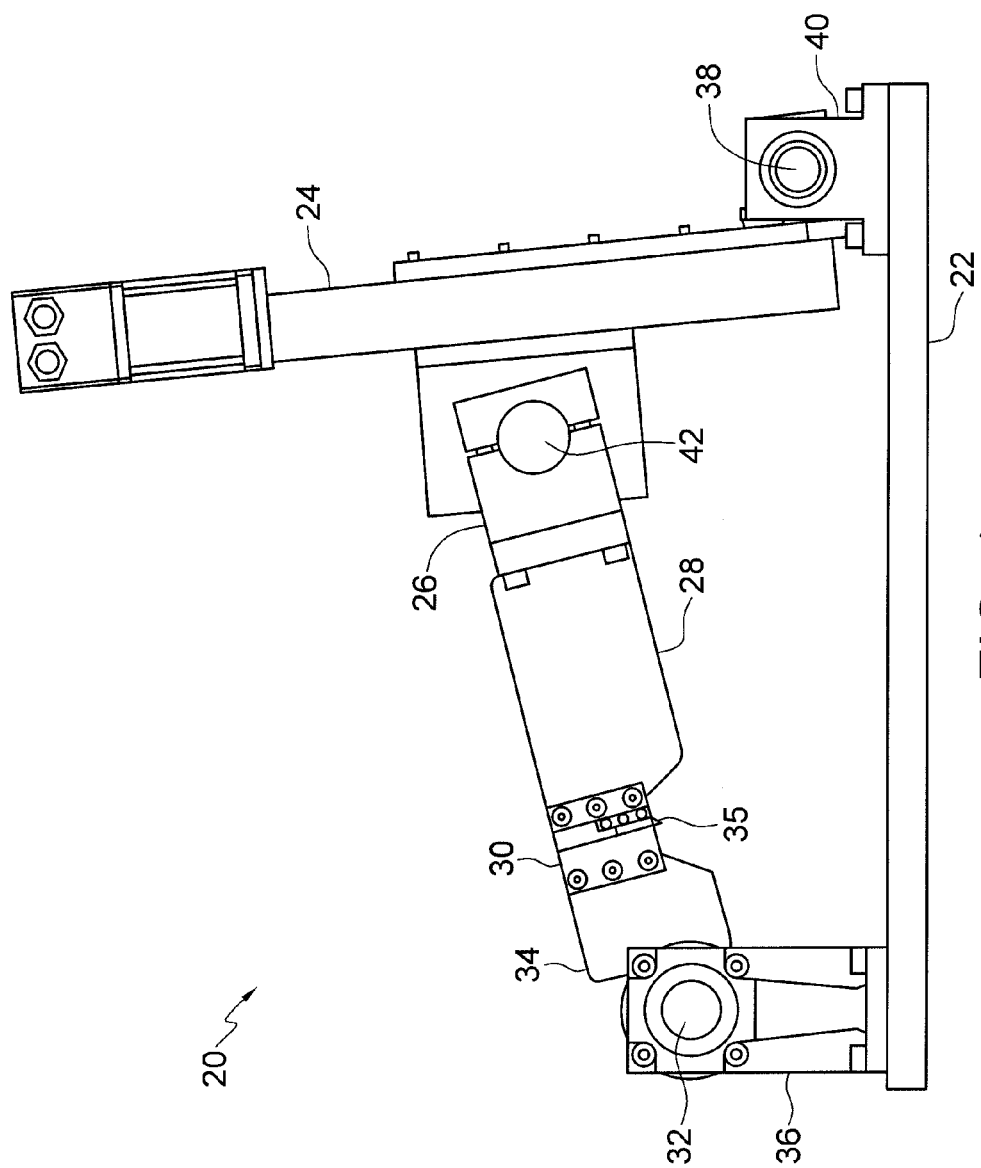
FIG. 1 is a side elevation view of a micro-scale hard-turning apparatus, according to an embodiment of the present invention.

Conventionally, it has been difficult to scale macro-scale hard-turning machine tools to the micro-scale while maintaining the stiffness and accuracy associated with hard-turning machine tools. Static stiffness is needed to reduce deflection from cutting forces, and is proportional to length. Dynamic stiffness is a measure of the ratio of an applied force to displacement, which occurs at the frequency of the exciting force. Dynamic stiffness is determined by the static stiffness of the machine tool as well as damping and natural frequency. As the components of the system shrink, their stiffness decreases at a faster rate than the cutting forces, and accuracy decreases. Dynamic stiffness is a function of static stiffness and a function of inertia, which itself is a function of mass (length$^3$). Cutting forces, on the other hand, decrease linearly.

While several micro-scale milling machine tools (mMTs) have been developed, these machines generally are designed for high accelerations. As a result, they typically use linear motors and low friction guideways, and have minimal stage inertia. These characteristics fit milling very well where the forces are low and acceleration requirements are high. In turning the forces can be an order of magnitude larger for similar material removal rates, and acceleration requirements are lower. Further, traditional machines are typically designed for a particular range of material removal rate. As the parts to be machined become smaller, the machines are forced to operate at a much lower material removal rate, decreasing their efficiency.

Example embodiments of the present invention provide a micro-scale machine tool (mMT) for hard-turning, especially for machining miniature parts and components. Such apparatuses, in comparison to some conventional mMT machines, provide increased stiffness and accuracy at the expense of travel and acceleration. "Micro-scale", as used herein, generally refers to having at least one dimension that is on the order of microns. "Miniature", as used herein, generally refers to having dimensions of 10 mm or less, though it is also contemplated that some dimensions may be slightly larger.

An mMT topology (layout) using the principles of leverage is provided according to example embodiments of the present invention for machining various miniature components. To meet desired surface finish tolerances without a secondary operation, the example mMT also can be made dynamically stiff. To meet desired accuracy requirements, an example machine tool can have high static stiffness and use high-accuracy actuators.

According to embodiments of the present invention, a base supports a pivot and an actuator. At least one member is coupled to the actuator at one end, and to the pivot at an opposed end. A tool mount for supporting a tool is disposed on the at least one member so that a first lever arm (referred to herein in some examples as a tool mount lever arm) is defined between the pivot and the tool mount, and a second lever arm (referred to herein in some examples as an actuator lever arm) is defined between the pivot and the actuator. The length of the first lever arm is shorter than the length of the second lever arm. When the actuator moves a distance, for example (but not necessarily) in a linear direction, the tool mount and thus the tool move a smaller distance along an arc. The reduction in movement distance of the tool can be provided by the relative lever arm lengths in combination with the other features of the configuration that are used in a particular embodiment. In a nonlimiting example embodiment, this smaller distance is approximated by the ratio of the lever arm lengths. This occurs, for example, for a linear actuator that is perpendicular to the at least one member. In other topologies, the smaller movement distance can vary, as will be appreciated by an artisan, but remains smaller for the tool versus the actuator. In this way, the effect of actuator error can be reduced, thus increasing accuracy of the tool movement. The amount that the effect of the actuator error is reduced will depend on the particular configuration employed. Additionally, the pivot and the actuator act in example embodiments as springs in parallel, increasing stiffness at the tool.

To further implement leverage in the tool, the actuator preferably is rotatably coupled to the base, and the at least one member preferably is rotatably coupled to the actuator via a suitable rotatable coupling. For example, another pivot may be fixedly coupled to the base to rotatably couple the actuator thereto. In this example embodiment, the second lever arm (e.g., the actuator lever arm) may be defined between the pivot coupled to the at least one member and the rotatable coupling provided between the at least one member and the actuator. In an example embodiment, to rotatably couple the at least one member to the actuator while decoupling actuator motions from the at least one member (e.g., by providing maximum stiffness in a radial direction and minimum stiffness in axial and angular directions), a decoupling link such as an aerostatic bushing may be provided. Also, to increase axial stiffness of the tool, a set of air bearings may be rotatably coupled to the at least one member and disposed between the tool mount and the actuator.

Preferred embodiments will now be discussed with respect to the drawings. The drawings include schematic figures that may not be to scale, which will be fully understood by skilled artisans with reference to the accompanying description. Features may be exaggerated for purposes of illustration. From the preferred embodiments, artisans will recognize additional features and broader aspects of the invention.

FIG. 1 shows an example micro-scale hard-turning apparatus 20, supported by a base 22. Though a single piece is shown for the base 22, it will be appreciated that the base may include more than one piece. An example base 22 is a block having opposed flat surfaces.

For implementing leverage in the example apparatus 20, an actuator 24 supported by the base 22 is disposed at or near one end 26 of a member, such as arm 28 supporting a tool mount 30, and a pivot 32 or rotary joint is disposed at or near an opposing end 34 of the arm. The member can be a single member, such as arm 28, or more than one member coupled (e.g., fixedly coupled) together. The arm 28, for example, may be provided by one or more beams, longitudinal members, etc. Thus, it will be understood that though the arm 28 is shown and described herein in certain example embodiments as a single piece, more than one member may be used in place of arm 28 without departing from general principles of the invention. Further, as used herein, "at an end" is intended to refer to a location either at or near the end.

The pivot 32 in turn is fixedly coupled (e.g., mounted) to the base 22, such as by a mount 36. In an example embodiment, the tool mount 30 is a turning tool mount, a boring tool mount, a collet, a chuck, etc., coupled to the arm 28 by suitable fasteners, such as but not limited to bolts. The tool mount 30 may be located by fixturing pins. The base 22, for example, may be any suitable casting or block, and the pivot 32 may be any suitable bearing, sliding contact, flexure, hydrostatic bearing, rolling element, etc.

Figure 2:
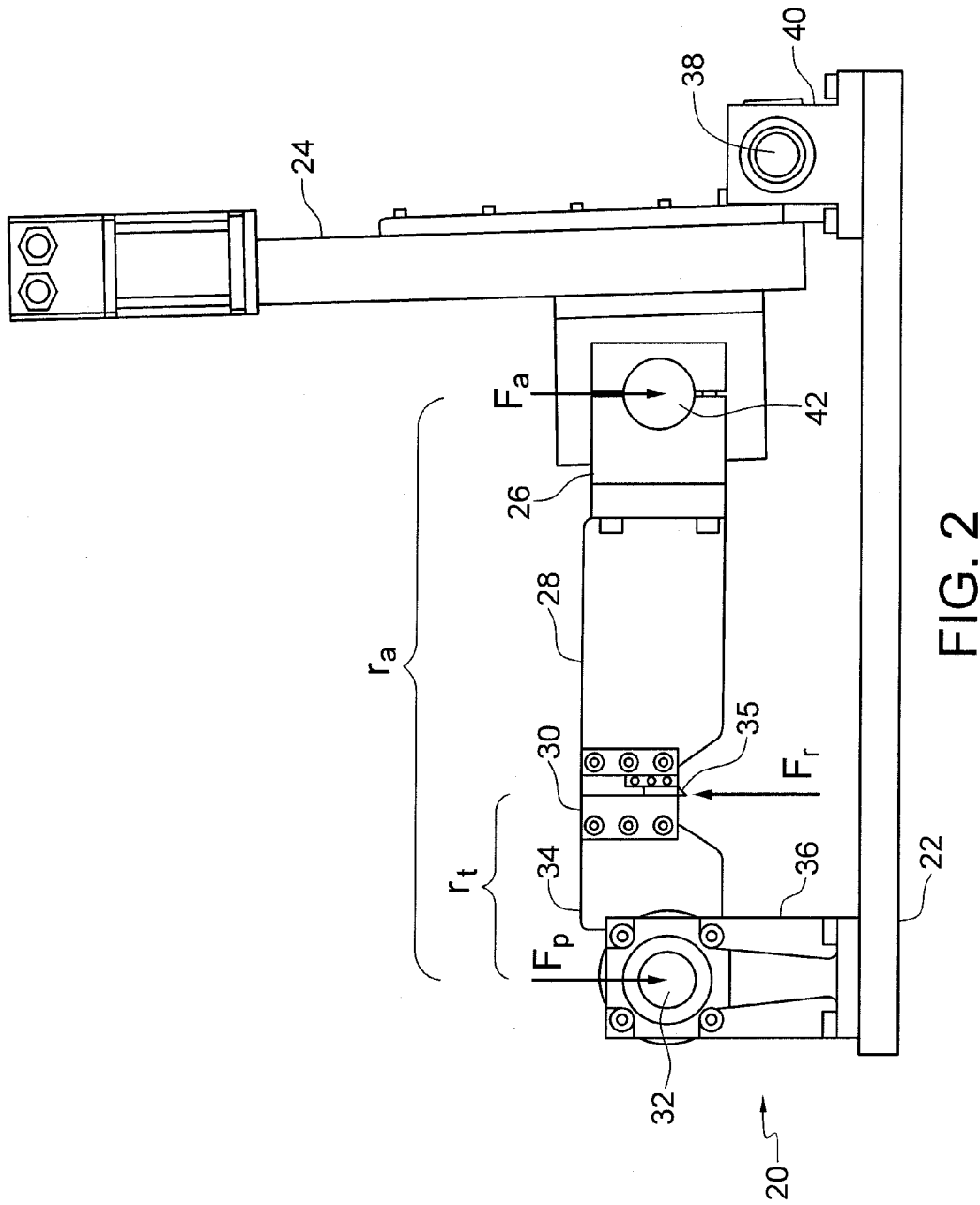
FIG. 2 shows example forces on a cutting tool for the hard-turning apparatus of FIG. 1.

As also shown in FIG. 2, the tool mount 30, and thus a tool 35 supported by the tool mount, is disposed along the arm 28 to define a lever arm, referred to in this and other examples as a tool mount lever arm, between the pivot 32 and the tool mount, and more particularly between the pivot and the tool 35 (or a tool holder in or on the tool mount, if the tool 35 is not in position). The arm 28 also defines a second lever arm, referred to in this and other examples as an actuator lever arm, between the pivot 32 and the actuator 24. The tool mount lever arm is shorter than the actuator lever arm. Operation of the actuator 24 rotates the arm 28 about the pivot 28, moving the arm 28 and thus the tool mount 30 in an arced or angular motion. The shorter tool mount lever arm relative to the actuator lever arm reduces the movement distance of the tool mount 28 relative to the movement distance of the actuator 24. Although the arm 28 provides spacing between the pivot 32, the tool mount 30 (and tool 35), and the actuator 24, thus defining the tool mount lever arm and actuator lever arm, the tool mount lever arm and actuator lever arm need not be physically along the arm 28 in all embodiments. As just one nonlimiting example, the tool mount lever arm and the actuator lever arm may be fixed to one another but at different angles or in different planes.

In an example embodiment, to help transfer motion (e.g., linear motion) of the actuator 24 to arced or angular motion of the arm 28 and thus the tool mount 30 and the tool 35, another pivot 38 or rotary joint rotatably couples the actuator 24 to the base 22. The pivot 38 may also be fixedly coupled to the base 22, such as by a suitable mount 40. Further, the arm 28 is rotatably coupled to the actuator 24 via a pivot or rotary joint 42 disposed at the end 26 of the arm. In this example embodiment, the actuator lever arm can be more particularly defined as the perpendicular distance between the axis of rotation of the pivot 32 coupling the end 34 of the arm 28 and the axis of rotation of the pivot or rotary joint 42 rotatably coupling the arm to the actuator 24 at the other end 26 of the arm. The tool mount lever arm in this example embodiment can be more particularly defined as the perpendicular distance between the axis of rotation of the pivot 32 and the tip of the tool 35 mounted within the tool mount 30. Those of ordinary skill in the art will recognize that the actuator lever arm and the tool mount lever arm may be defined differently depending on the particular configuration used. For example, if the actuator 24 is configured to move along an arc, the actuator lever arm length can be defined as the distance from the axis of rotation of the pivot 32 to an encoder used to measure the motion of the actuator. However, the tool mount lever arm can be generally described as being in between the pivot 32 and the tool mount 30, and the actuator lever arm can be generally described as being in between the pivot 32 and the actuator 24. Nonlimiting examples for the pivot 38 includes radial bearings, aerostatic bushings, sliding contact, flexure, hydrostatic bearing, rolling element, etc. A nonlimiting example for the pivot 42 includes an aerostatic bushing, but may also include hydrostatic bushing, radial bearings, sliding contact, flexure, hydrostatic bearing, rolling element, etc.

The actuator 24 in an example embodiment is a linear actuator, such as but not limited to a screw-driven stage. Lead screws provide static and dynamic stiffness in macro-scale machine tools. However, screw-driven stages typically have two disadvantages when applied to mMTs. When a screw is scaled down in size, the stiffness of that screw decreases with the square of its diameter. Second, the accuracy of a screw-driven stage has practical limitations due to the design and manufacture of the screw. A rotary encoder is typically used on a screw-driven stage, but the encoder can only determine the angular position of the screw. Therefore, any inconsistency in the screw creates uncompensated errors in the output position. The example topology shown in FIG. 1 improves accuracy of the actuator 24 by translating its motion to a smaller (that is, over a shorter distance), arced or angular motion for the tool mount 30.

In addition to increasing the accuracy of the actuator 24, the example apparatus 20 provides greater stiffness. Particularly, force on the tool 35 in the radial direction is transferred to the base 22 through both ends 26, 34 of the arm 28. FIG. 2 shows a radial force on the tool 35 from a cutting process. The reaction forces on the actuator 24 and pivot 32 are labeled. A moment balance equation shows that the example topology reduces the force on the actuator 24 based on the inverse ratio $$\left(\frac{r_t}{r_a}\right),$$

$$\sum M = F_r * r_t + F_a * r_a = 0 \quad (1)$$

$$F_a = F_t \frac{r_t}{r_a} \quad (2)$$

where $F_r$ is the radial force on the tool 35, $F_p$ is the force on the pivot 32, $F_a$ is the force on the actuator 24, $r_a$ is the actuator lever arm length (e.g., the perpendicular distance from the axis of rotation of the pivot 32 to the axis of rotation of the pivot or rotary joint 42 coupling the arm 28 to the actuator 24), and $r_t$ is the tool mount lever arm length (e.g., the perpendicular distance from the axis of rotation of the pivot 32 to the axis of rotation of the tool 35).

Similarly, $$F_p = F_t \left(1 - \frac{r_t}{r_a}\right). \quad (3)$$

For an actuator 24 with a given stiffness, a reduction in force at the actuator increases the stiffness at the tool. Additionally, the stiffness at the tool 35 can be increased by increasing the stiffness at the pivot 32. Eqn. 3 gives the force at the pivot 32. The pivot stiffness can be easily increased by changing the radial bearing or increasing the support 36 cross-section.

In a topology such as that for the example apparatus 20, only the radial motion of the actuator 24 is desired at the tool tip for the tool 35. However, misalignment and straightness errors in the actuator 24 will result not only in small axial motions but undesirable angular motions as well. By selectively decoupling the undesired motions of the actuator 24 from the arm 28, the tool tip error is reduced.

Figure 3:
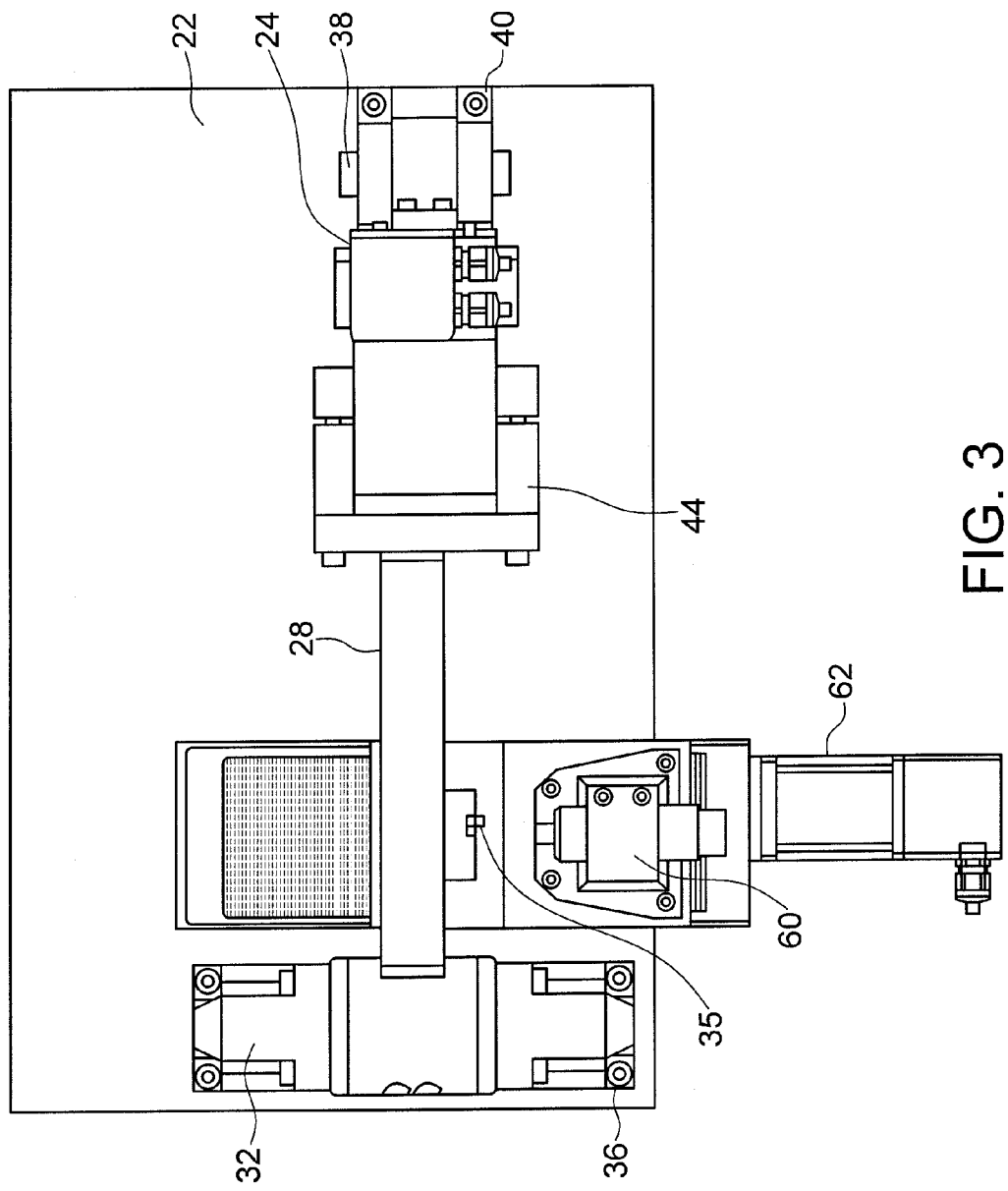
FIG. 3 is a top plan view of the hard-turning apparatus of FIGS. 1-2, further showing a spindle and axial actuator.

Accordingly, decoupling is provided in an example apparatus by rotatably coupling the arm 28 to the actuator 24 with a link 44 having maximum stiffness in the radial direction and minimum stiffness in other directions, such as but not limited to the axial and angular directions. An example of such a link 44 is an aerostatic bushing, though other types of bushings or other couplings can be used as described above. Referring particularly to FIG. 3, the bushing 44 allows rotation at the joint (e.g., pivot or rotary joint 42) coupling the arm 28 to the actuator 24 and provides sufficient stiffness in the radial direction (e.g., 72 µm). The bushing 44 further allows the actuator 24 to translate in the axial direction without impacting the arm 28 and the tool 35. An example bushing 44 has low stiffness (e.g., 11 Nm/mil rad) in the pitch direction. As a result, any angular misalignment of the example actuator 24 will have little effect on the tool tip.

While the example actuator 24 has poor stiffness in the axial direction, decoupling the actuator 24 further decreases the axial stiffness of the tool tip. To increase the axial stiffness in an example embodiment a set of bearings, e.g., preloaded air bearings 46, are disposed between the tool 35 and the actuator 24, as shown by example in FIG. 4. The air bearings 46 are disposed so that the axis of rotation 49 is as close as possible to the tool tip of the tool 35. This axis of rotation 49 is from the center of thrust bushings 48 at the pivot 32 to the center 50 of the air bearings 46. By placing the air bearings 46 in this configuration, forces on the tool tip cause a minimum amount of rotation in the arm 28. Air bearings provide stiffness in only one direction while traversing an arc. Traditional bearings, on the other hand, provide stiffness in all but one direction. The example air bearings 46 ride on a plate 52 that can easily be ground to achieve parallelism and flatness of 5 µm or better. Example air bearings 46 have a stiffness of 116 N/µm in the axial direction.

Figure 4:
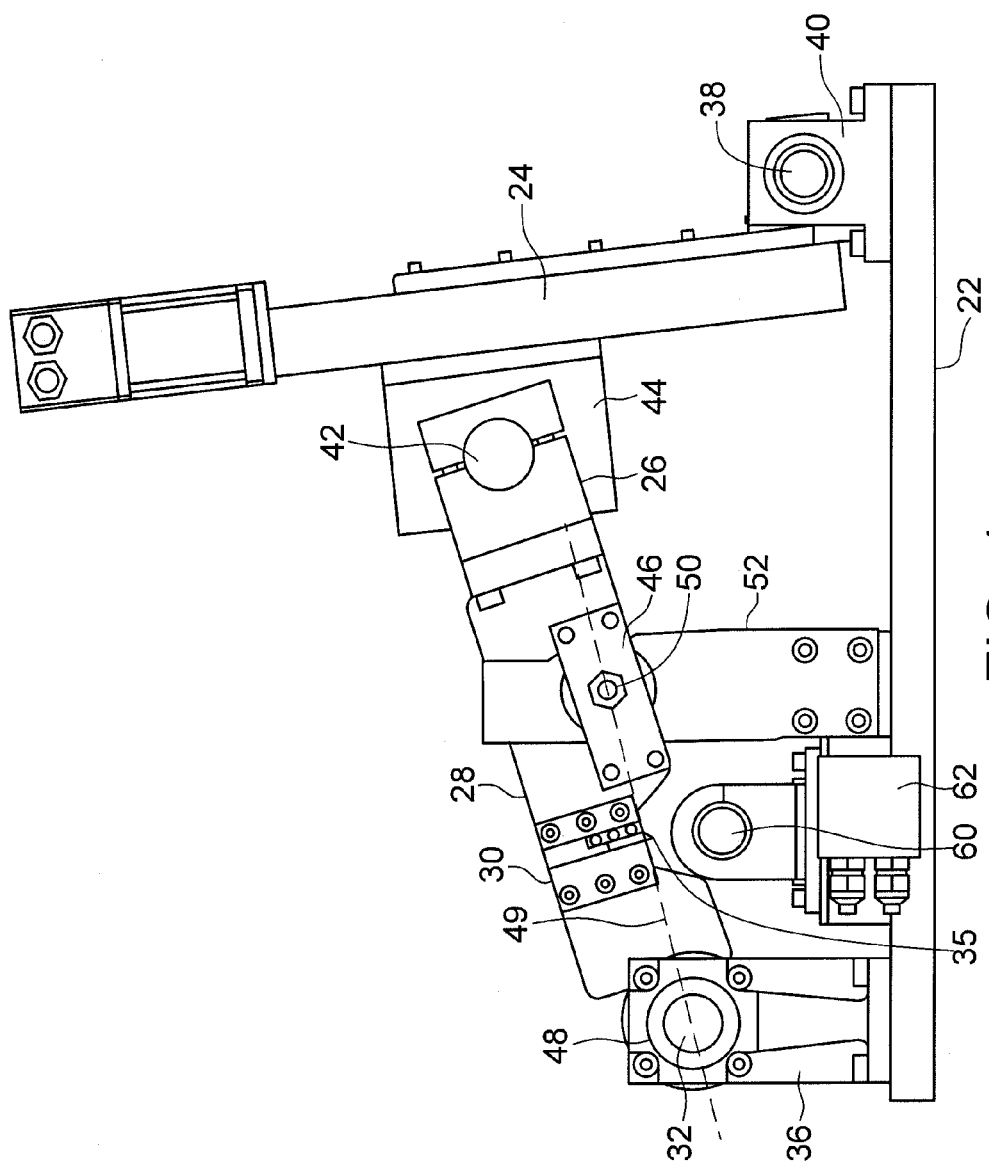
FIG. 4 is a side elevation view of the hard-turning apparatus of FIGS. 1-3, further showing air bearings.
Figure 5:
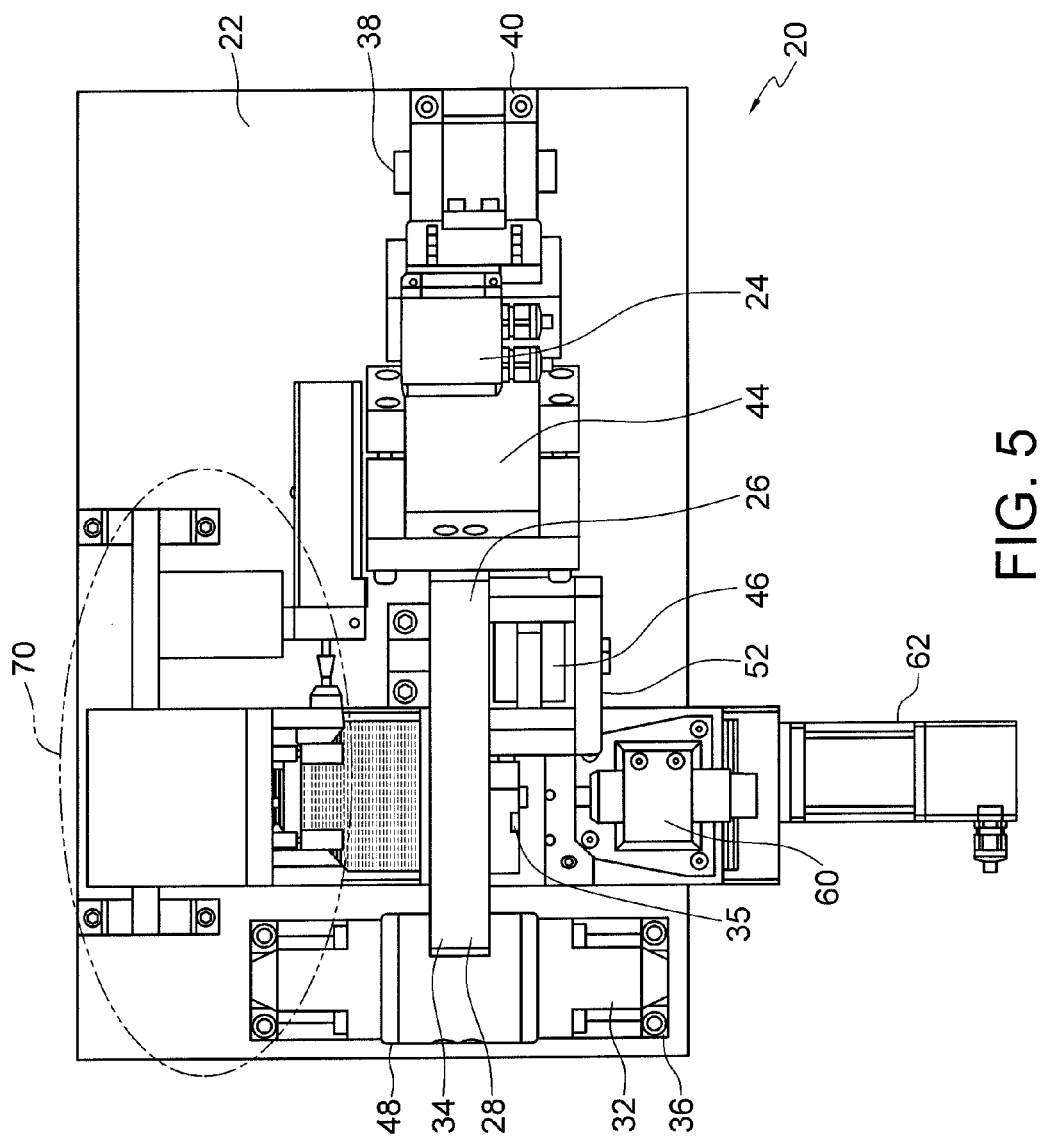
FIG. 5 is a top plan view of the hard-turning apparatus of FIGS. 1-4, further showing a metrology system.

In a typical turning machine a spindle is mounted directly to the machine base. In a nonlimiting example apparatus, as shown in FIGS. 3-5, a spindle 60 is mounted to an actuator 62 for moving the spindle in the axial direction. This allows integration of other processes into the example apparatus 20. The tool 35 can thus be moved to its maximum radial position, allowing the spindle 60 to move under the arm 28.

Consideration of desired parameters such as static stiffness (e.g., radial, axial, tangential), dynamic stiffness (e.g., radial, axial, tangential, at frequency of exciting force), accuracy, surface finish, working volume (e.g., radial, axial, tangential) can be combined with a consideration of leverage ratio (or other leverage assessment depending on the particular topology used) to select suitable actuators for the actuator 24 (in the example embodiment, referred to as a radial actuator) or the actuator 62 (in the example embodiment, referred to as an axial actuator). In a nonlimiting example embodiment given the topology shown in FIGS. 3-5, to provide a tolerance requirement for finished parts of +/−1 µm, the axial direction actuator 62 can have an accuracy of at least +/−1 μm. To obtain +/−1 μm accuracy on the diameter, the radial position of the tool can be controlled to +/−0.5 μm. Selecting a leverage ratio of two, the radial actuator 24 can have an accuracy of +/−1 μm. For an example working volume of 12 mm radial (X), 10 mm (Y), and 0 mm tangential (Z), the example axial actuator 62 can have at least 10 mm of travel. The radial actuator 24 can have a travel of at least the maximum radius (e.g., 12 mm) times the leverage ratio.

The spindles 60 that are used in example embodiments have high stiffness and low runout. An example spindle 60 is a ball bearing spindle with runout less than 1 μm. In example embodiments, a commercially available spindle can be used for the micro-scale hard-turning apparatus 20.

With the spindle 60 moved past the arm 28, a workpiece coupled to the spindle is accessible to secondary processes, if desired. As a nonlimiting example, due to the difficulty of handling micro-scale parts, it may be advantageous for the apparatus to include a metrology system. As shown in FIG. 5, a metrology system 70 may be provided, mounted to the base 22 and disposed within an axial path of the spindle 60. A nonlimiting metrology system includes a touch probe and high accuracy stage.

In a conventional turning machine the integration of a metrology system requires several actuators to move the system into place and a kinematic mounting system. To accommodate the example metrology system 70 shown in FIG. 5, travel for the radial actuator 24 is increased to allow the arm 28 to clear the spindle 60, and travel for the axial actuator 62 is increased to allow the spindle to move along the axial path to the metrology system. In an example apparatus, mounting the metrology system 70 and increasing the axial and radial actuator 24, 62 travel increases the volume of the apparatus 20 from 0.102 m$^3$ to 0.154 m$^3$.

The radial actuator 24 and the axial actuator 62 are electrically coupled (e.g. via suitable wiring) to a controller (not shown) for selectively controlling the radial actuator and the axial actuator. A nonlimiting example controller is a DeltaTau GeoBrickDrive. This controller provides the ability to implement complex forward and inverse kinematics. The controller includes control electronics as well as amplifiers to drive the radial actuator 24 and the axial actuator 62 in a single unit. In an example embodiment, printed circuit boards are provided to route signals and supply power to an encoder and limit switches for the radial actuator 24 and the axial actuator 62. Additionally, an emergency stop switch is included, which removes power from the actuators 24, 62. However, it will be understood that various controllers are possible, and that the present invention is not to be limited to a particular controller or type of controller.

To control the position and orientation of the tool tip given the leverage topology provided by the example apparatus 20 while in operation, forward and inverse kinematics may be determined. The Denavit-Hartenberg (DH) convention is used in an example method to calculate the kinematics of the apparatus 20. The DH convention creates a unique coordinate frame for each joint (e.g., pivots 32 and 38, and the pivot 42 at decoupling bushing 44) in the apparatus 20. From this convention a homogeneous transformation matrix can be created between each joint. The transformation matrix is designated as $A_j^i$, where i is the starting coordinate frame and j is the next coordinate frame. For example, transformation matrix $A_2^1$ specifies the transformation from coordinate frame 1 to 2. In this example method each transformation matrix has only one variable—either the joint rotation ($\theta_j$) or the joint translation ($d_j$).

Figure 6:
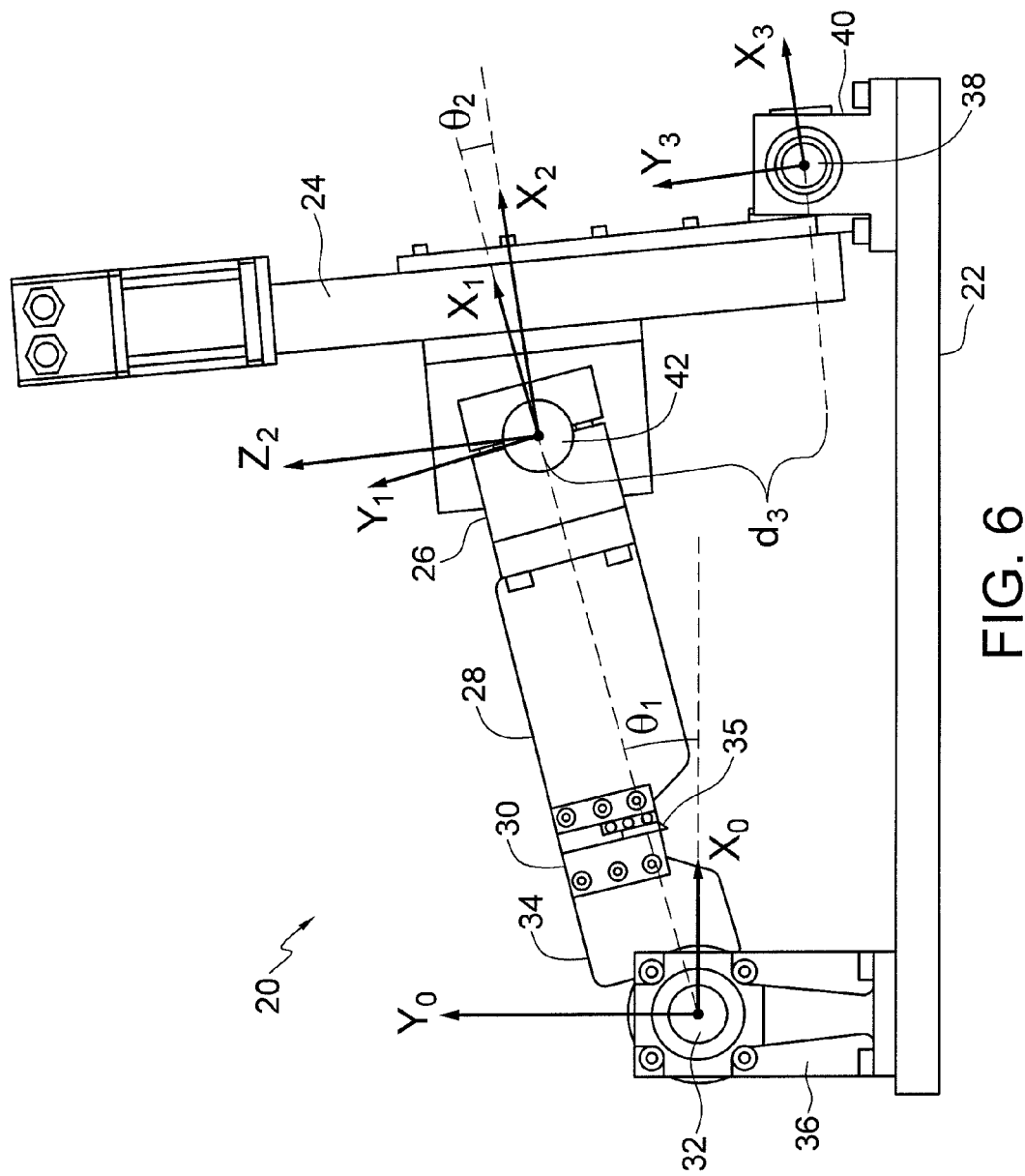
FIG. 6 shows Denavit-Hartenberg (DH) coordinate frame assignments for the micro-scale hard-turning apparatus.

FIG. 6 illustrates DH coordinate frame assignments for the example apparatus 20 shown in FIGS. 6-10. A closed kinematic chain is formed from coordinate system 0, through the arm 28 and radial actuator 24 (coordinate frames 1 and 2) to coordinate system 3 and finally through the base 22 back to coordinate system 0. A system of equations that represents the connections in the system is given as $$T_3^0 = A_1^2 * A_2^0 * A_3^2. \tag{4}$$

$T_3^0$ has 3 variables, one from each A matrix. They are $\theta_1$, $\theta_2$, and $d_3$, as shown in FIG. 6. $\theta_1$ is defined as the angle from axis $x_0$ to $x_1$. $\theta_2$ is defined as the angle from $x_1$ to $x_2$. $d_3$ is the distance from the origin of frame 2 to axis $x_3$ along axis $z_2$. The transformation matrix $T_3^0$ gives the position and orientation of coordinate frame 3, denoted in FIG. 7 as $d_x$, $d_y$, and $\theta_3^0$.

Figure 7:
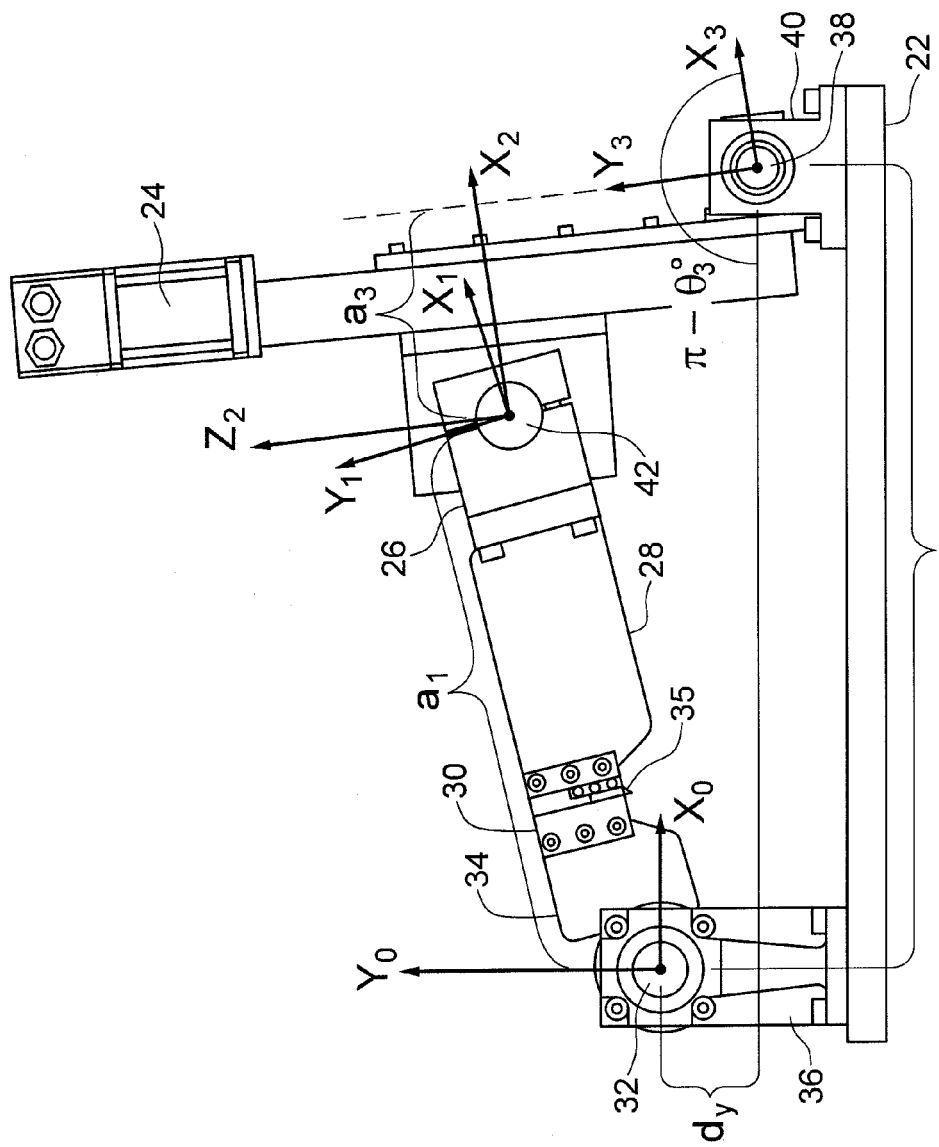
FIG. 7 shows position and orientation for a coordinate system (coordinate system 3) for the micro-scale hard-turning apparatus.

The arm 28 rotates about the pivot 32, and the tool 35 is rigidly attached to the arm. $\theta_1$ specifies the angle of the arm 28. Therefore, an equation for $\theta_1$ is necessary to determine the location of the tool tip. $\theta_1$ can be solved for as a function of $d_3$ by entering $d_x$ and $d_y$ into Eqn. 4. The value of $d_x$ and $d_y$ are known constants based on the example design geometry as shown in FIG. 7. Accordingly, for the example apparatus 20 the equation for $\theta_1$ is:

$$C = \begin{bmatrix} a_1 \\ a_3 \\ d_x \\ d_y \end{bmatrix} \tag{5}$$

$$\theta_1 = f(C, d_3) \tag{6}$$

where $a_1$ and $a_3$ are known constants based on the design geometry. $a_1$ is defined as the distance from the $z_0$ axis to the origin of coordinate frame 1 along the $x_1$ axis, and $a_3$ is the distance from the $z_2$ axis to the origin of coordinate from 3 along the $x_3$ axis. Therefore, $$\theta_1 = \cos^{-1}\left[\frac{a_1^3 d_x - a_1 a_3^2 d_x - a_1 d_3^2 d_x + a_1 d_x^3 + a_1 d_x d_y^2 + \sqrt{-a_1^2 d_y^2 (a_1^4 + (a_3^2 + d_3^2 - d_x^2 - d_y^2)^2 - 2a_1^2(a_3^2 + d_3^2 + d_x^2 + d_y^2))}}{2a_1^2(d_x^2 + d_y^2)}\right] \tag{7}$$

Figure 8:
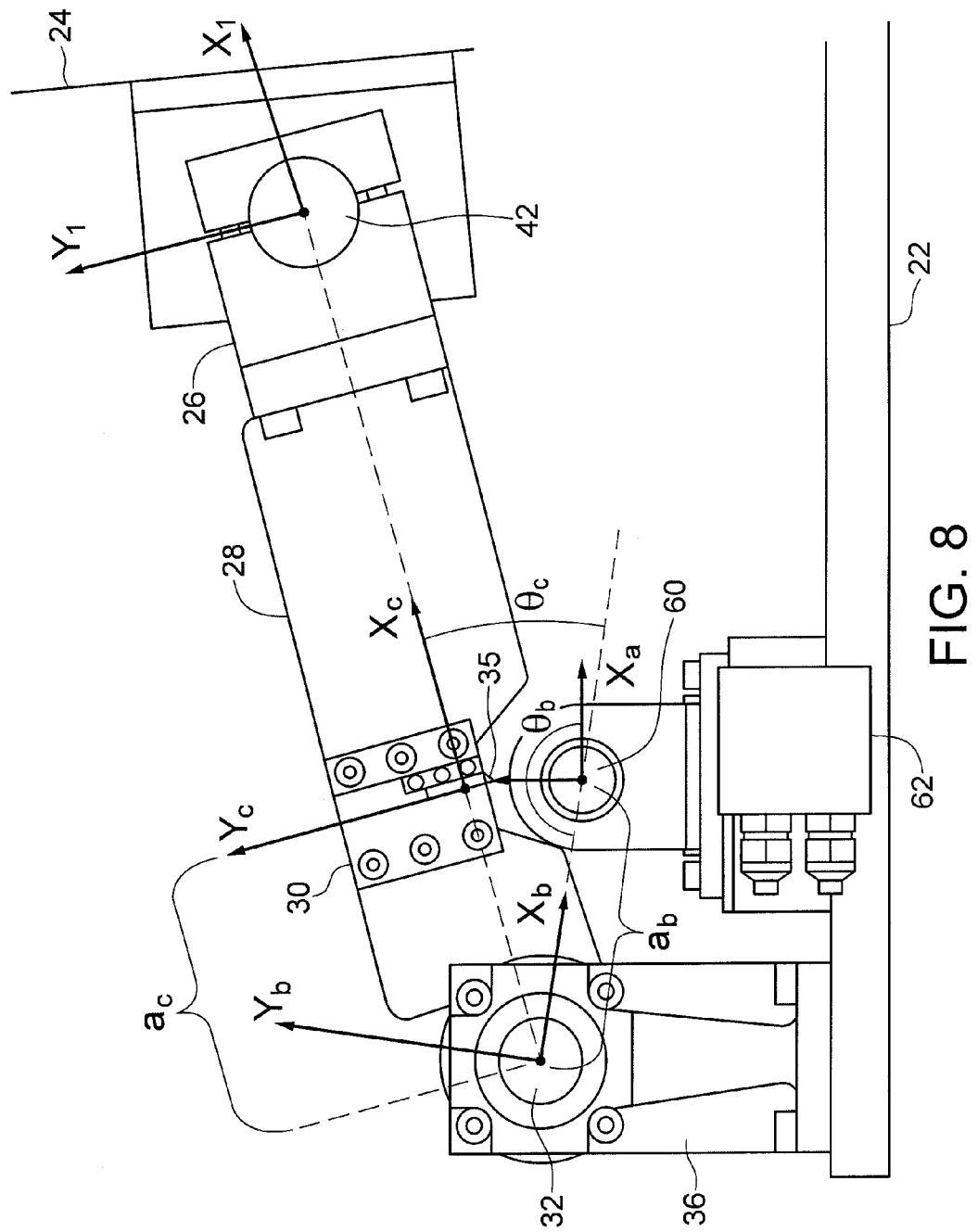
FIG. 8 shows b and c DH coordinate frame assignments for the micro-scale hard-turning apparatus.
Figure 9:
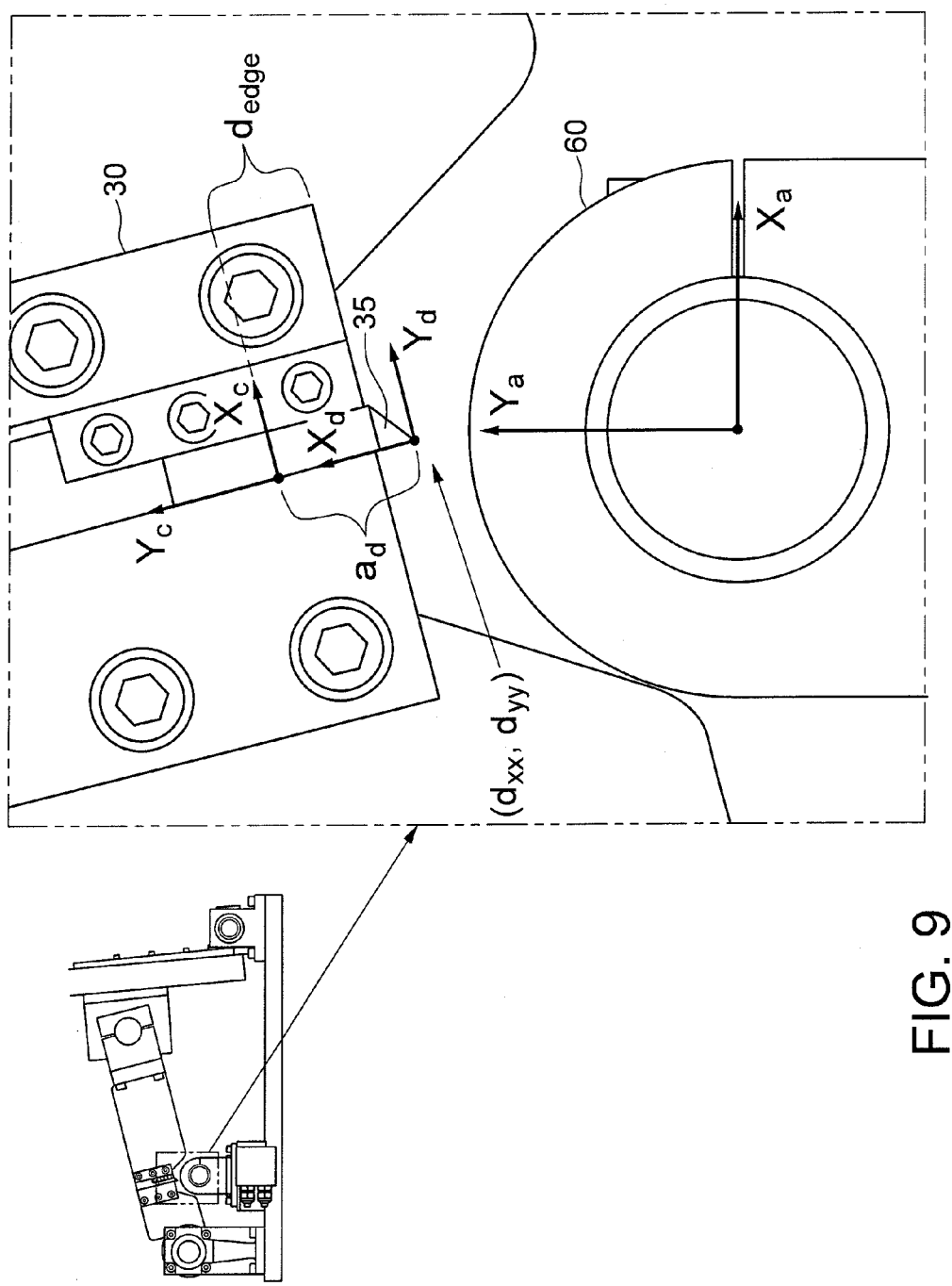
FIG. 9 shows tool tip location a, c, and d DH coordinate frame assignments.

DH coordinate frames for the tool tip location are shown in FIGS. 8 and 9, where the frames are labeled with letters to distinguish them from the above calculations. The distance (r) from the spindle 60 center to the tool tip was determined using the DH convention. When cutting, this is equivalent to the workpiece radius. Coordinate frame b is located at the origin of frame 0 and shown in FIG. 8. Coordinate frame c is located at the intersection of a line between frame b and frame 1 and the top face of the tool 35 shank, and it is parallel/perpendicular to the tool shank. Frame c is not necessary for the DH convention, but it is added to introduce $a_d$ specifying tool tip location. The origin of frame d is located at the tool tip. $a_d$ is defined by the design geometry and the tool "stickout" from the tool mount 30, and is the distance from the $z_c$ axis to the origin of coordinate frame d along the $x_d$ axis. $a_d$ is useful for determining the proper rake angle of the tool 35. $a_b$ is a known constant based on the design geometry, and it is defined as the distance from the $z_a$ axis to the origin of coordinate frame b along the $x_b$ axis. $\theta_b$ is the angle between axis $x_d$ and $x_b$. This angle is constant and known based on the design geometry. $a_c$ is a known constant based on the design geometry and is defined as the distance from the $z_b$ axis to the origin of coordinate frame c along the $x_c$ axis. The position of the tool tip is given as ($d_{xx}$, $d_{yy}$) in coordinate from a, viz., $$T_d^a = A_b^a * A_c^b * A_d^c \tag{8}$$

where $$\theta_c = \theta_1 - \theta_b + \pi \tag{9}$$

$$d_{xx} = a_b \cos(\theta_b) + a_c \cos(\theta_b + \theta_c) - a_d \sin(\theta_b + \theta_c) \tag{10}$$

$$d_{yy} = a_d \cos(\theta_b + \theta_c) + a_b \sin(\theta_b) + a_b \sin(\theta_b + \theta_c) \tag{11}$$

$$r = \sqrt{d_{xx}^2 + d_{yy}^2} \tag{12}$$

In some example operations, low radial dynamic stiffness may be present at certain frequencies, which may result in poor surface finish, chatter, or increased tool wear if not addressed. One way to address such low radial dynamic stiffness is to change the cutting speed. Example embodiments of the present invention allow a sufficient range of cutting speeds to accommodate such speed adjustments. Other ways to improve performance of example machine operations include calibration. For boring operations, removal of cut chips may be helpful such as by using an air jet. An example air jet may be integrated into a boring bar mount if space between the tool mount and the workpiece is too tight.

Figure 10:
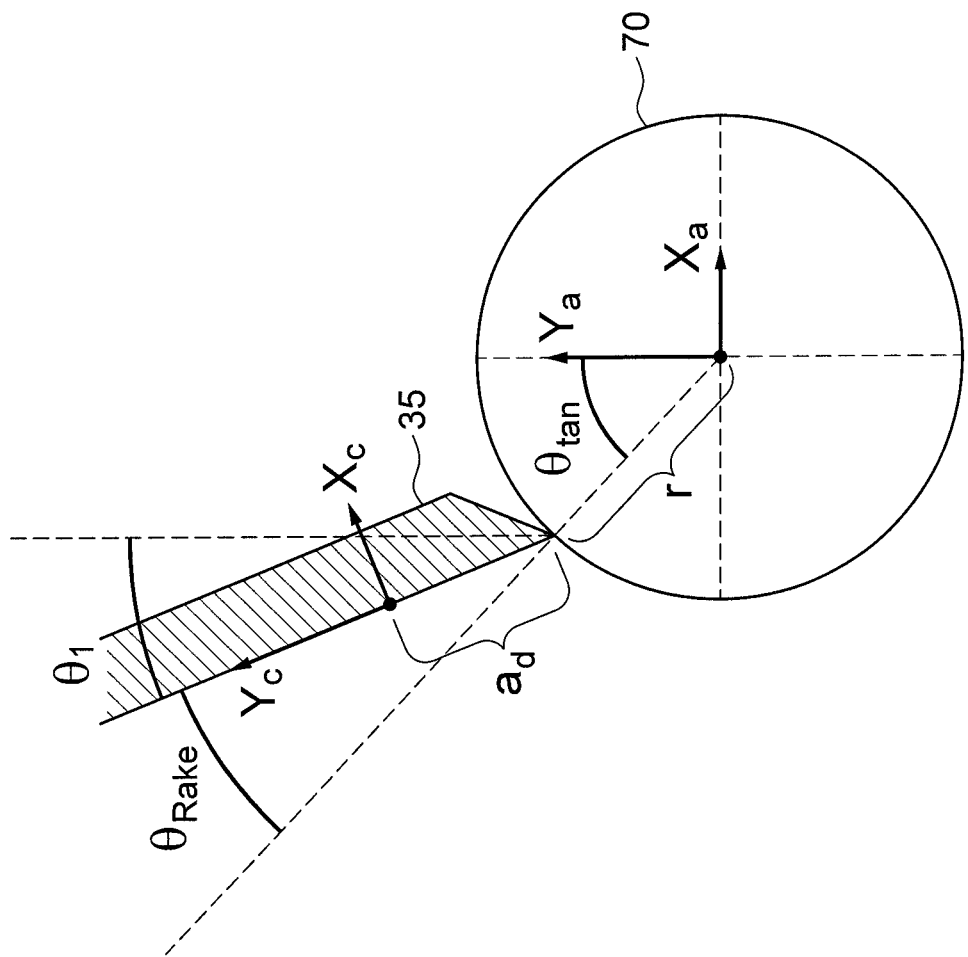
FIG. 10 shows example parameters for determining a tool rake angle.

For improved, more consistent performance of the example apparatus 20, it is also helpful to limit changes in a rake angle of the cutting tool 35. In turning, the rake angle of the cutting tool 35 is defined as the angle of the tool rake race relative to the line passing through the tool tip engagement point and the center of a workpiece 70. FIG. 10 shows the rake angle for an example tool tip. In a conventional machine tool, the rake angle is independent of the topology, tool location, or workpiece size. The rake angle is typically set by an angle ground in the tool 35 or through the tool holder 30 and remains constant. In an example apparatus 20 of the present invention, for a given diameter, this angle is set by the tool position $a_d$ and will vary as the cut proceeds, that is, as the workpiece diameter is reduced to achieve a given size. In example embodiments, this change in rake angle can be controlled by design of the tool 35 and selection of the tool location.

For example, in the apparatus 20 shown in FIGS. 1-9, the rake angle can be computed from the tool angle ($\theta_1$ in FIG. 6) and the tangent angle ($\theta_{tan}$) as shown in FIG. 10. The tool angle and tangent angle are measured against a common reference, in this case the Y axis of coordinate frame a (vertical). The rake angle is equal to the angle of the tool ($\theta_1$) with respect to coordinate frame a minus the tangent angle ($\theta_{tan}$), viz., $$\theta_{Rake} = \theta_{tan} - \theta_1 \tag{13}$$

where $$\theta_{tan} = \tan^{-1}\left(\frac{d_{xx}}{d_{yy}}\right). \tag{14}$$

The tool angle is a function of $d_3$ and system constants (C) as shown in Eqn. 7. The tangent angle is a function of $a_b$, $a_c$, $a_d$, $\theta_b$, and $\theta_1$ as shown in Eqns. 9-12. It is assumed here that the rake angle is a function of the inclination of the tool 35 rather than ground into the tool rake face.

Define delta rake angle ($\theta_{\Delta Rake}$) as the change in rake angle as a result of the change in the radial position of the tool tip during cutting. The effect of delta rake angle can minimized by varying the system constants. In particular, the delta rake angle effect can be minimized by increasing the distance from the pivot to the tool ($a_c$). When this distance increases the angular motion ($\theta_1$) and $d_{xx}$ decrease, decreasing delta rake angle (Eqn. 10). The maximum distance from the pivot to the tool is limited by the required leverage ratio, the maximum allowable size of the apparatus, and stiffness requirements. An example apparatus minimizes the delta rake angle to encounter a range of diameters between 4 mm and 24 mm.

Additionally, the rake angle can be set for specific cutting conditions. For the example apparatus 20 the rake angle is a function of $a_d$ and the diameter being turned. $a_d$ can be adjusted by changing the position of the tool in the tool mount. To determine $a_d$ the distance from coordinate frame c to the edge of the tool holder 35 can be calculated ($d_{edge}$) as shown in Eqn. 10. $d_{edge}$ is a known constant based on the apparatus design. Then, measurements can be made from the tool tip to the edge of the tool holder and added to $d_{edge}$ to determine $a_d$.

Figure 11:
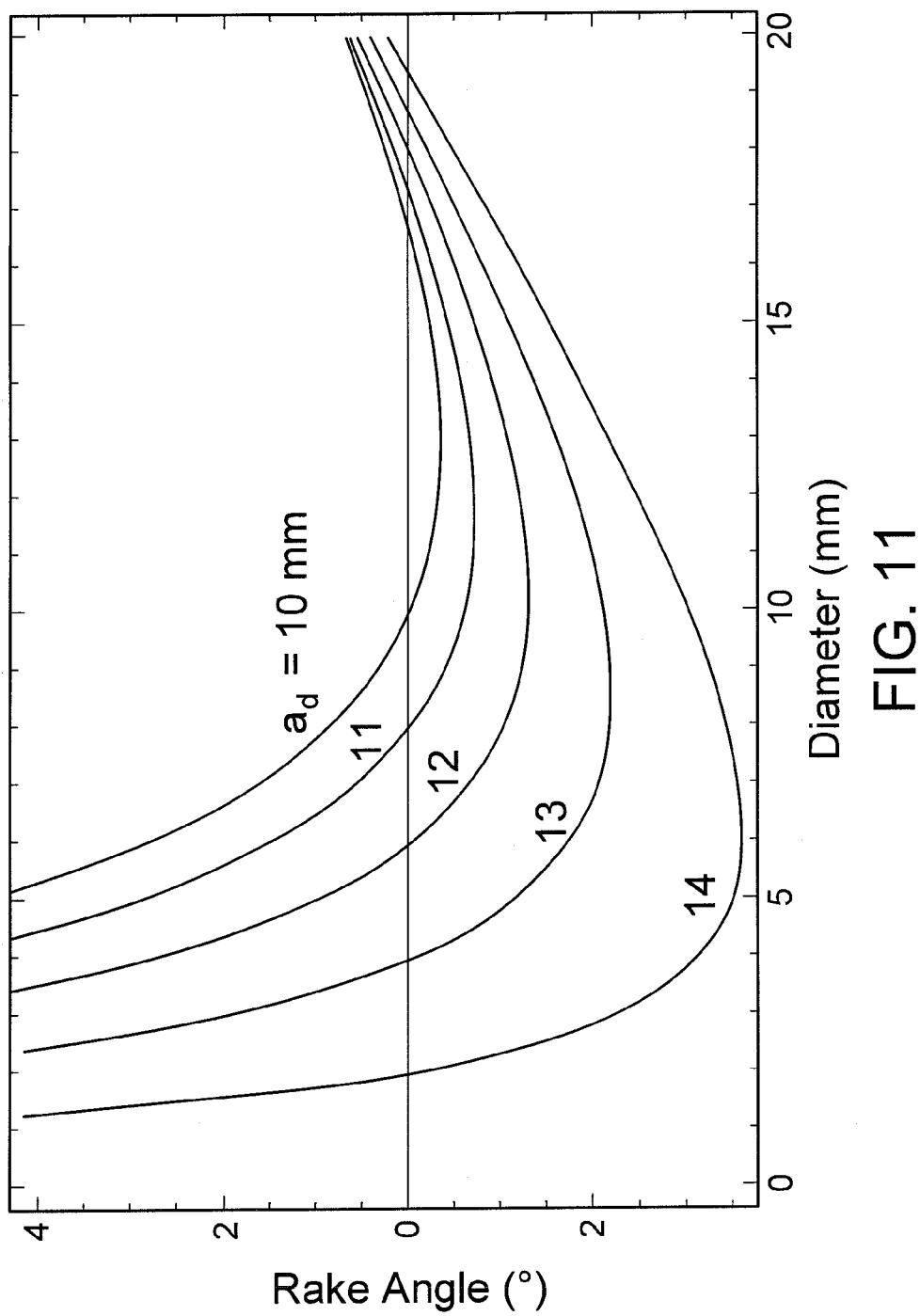
FIG. 11 is a graph showing change in rake angle with tool position.

For example, FIG. 11 shows example values for $d_3$ corresponding to possible actuator positions input into Eqn. 7 to determine $\theta_1$. Then, Eqns. 9-12 are used to determine the diameter with the appropriate value for $a_d$ in Eqns. 10 and 11. Finally, the corresponding rake angles are calculated using Eqns. 13 and 14. FIG. 11 can be used to choose a tool position ($a_d$) to achieve the desired rake angle over the diameter range being considered, viz., 4 mm to 24 mm. FIG. 11 can also be used to determine the change in rake angle (delta rake angle) for a given cut. The example shown in FIG. 11 was constructed to set rake angles between +4° and −4°.

In most hard-turning applications the rake angle is typically held near 0°. Slightly positive or negative rake angles can be achieved in two ways on the example apparatus. For example, if a 2° positive rake is desired for the cut, a tool could be ground with a 2° rake angle and a chart such as shown in FIG. 11 could be used to set the "rake angle" at 0°. Alternately, a tool with a 0° rake face could be used, and the tool position ($a_d$) could be chosen by consulting a chart such as FIG. 11 to produce a rake angle of 2°. The tool "stickout" is then determined as ($a_d$−$d_{edge}$). Such values can be easily tabulated to facilitate tool setting.

Suppose the initial diameter of a workpiece in 10 mm and a rake angle of 0° is required. Using FIG. 11 the tool offset should then be $a_d$=10 mm. If the final diameter of the workpiece is to be 9 mm, then FIG. 11 shows that the change in rake angle (delta rake angle) over this cut would be +0.5°. That is, at the end of this cut, the rake angle will be +0.5°.

FIG. 11 further shows the sensitivity of the rake angle to diameter size. As the diameter becomes larger, the effect of changing the delta rake angle decreases. The system constants ($a_b$, $a_c$, and C in Eqn. 5) can be modified in the design phase to optimize the curves in FIG. 11 for a particular diameter range. For the example machine parameters chosen for large diameters, some adjustment to the tool rake angle may be needed depending on the rake angle desired.

Among other miniature parts or components that may be machined using embodiments of the present invention, hard-turning micro-scale tools can be used to produce miniature bearings. Tightest tolerances on components in an example miniature bearing are +/−1.26 μm to meet ABEC 9P standards. To meet the rolling resistance specifications for these example bearings, the surface finish of the bearing races should be less than 50 nm Ra. Super-finishing operations used in industry commonly achieve 25 nm Ra. Example static stiffness is at least 10 N/μm in all directions. Minimum dynamic stiffness between 50 and 500 Hz (three times a highest example spindle frequency) for the example tool is 30 N/μm.

Turning does not require a large range of motion. An example hard-turning micro-scale tool designed for particular miniature bearings has at least 12 mm of radial travel and at least 10 mm of axial travel. This allows the example tool to turn bearing components up to 24 mm in diameter. Bearings 24 mm in diameter typically have widths below 10 mm.

By using the principle of leverage provided in the apparatus 20 shown in FIG. 1 the accuracy of the screw used in the actuator 24 can be increased at the expense of travel. Such example embodiments take advantage of the small travel requirements for micro-scale machining. As a nonlimiting example illustrating the use of leverage, the arm 28 may be 330 mm long to accommodate the pivots 32, 38, 42, bearings 46, the spindle 60, etc. The tool 35 may be located 105 mm from the pivot 32, providing a leverage of 3.14. This creates a radial travel requirement of 37.7 mm. In a nonlimiting example, precision ball screw actuators 24 are used for both the radial and axial actuators, each having a travel of 50 mm and accuracy of +/−0.75 μm, which after the effect of the leverage exceeds requirements for an example miniature part such as a miniature bearing race.

Apparatuses for micro-scale hard turning machines have been disclosed herein, providing various features and advantages. Example micro-scale hard turning machines provide increased stiffness to a tool as well as improved accuracy, and results in higher precision by decoupling to reduce unwanted motion. A hard turning process using an example apparatus can be faster because the entire machining process can be carried out on a single machine, cheaper than grinding due to high operating efficiencies and low cost of equipment. Miniature parts can be made with better, more consistent life expectancy and higher yields.

Example micro-scale hard turning apparatuses according to embodiments of the present invention can be used to manufacture diverse parts or components such as, but not limited to, miniature bearing races, cell phones, medical devices, valves and/or any number of increasingly miniaturized products.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. An apparatus for supporting a tool for hard turning, the apparatus comprising:
   a base;
   a pivot coupled to said base;
   an actuator coupled to said base;
   at least one member coupled to said actuator at one end and rotatably coupled to the pivot at another end; and
   a tool mount disposed on said at least one member;
   said at least one member defining a first lever arm between said pivot and said tool mount, and a second lever arm between said pivot and said actuator, the first lever arm having a length that is less than a length of the second lever arm;
   wherein said actuator moves said tool mount along an arc.

2. The apparatus of claim 1, wherein said actuator is rotatably coupled to said base via another pivot.

3. The apparatus of claim 2, wherein said at least one member is rotatably coupled to said actuator via a link.

4. The apparatus of claim 3, wherein said actuator comprises a linear actuator.

5. The apparatus of claim 4, wherein said actuator comprises a screw-based actuator.

6. The apparatus of claim 4, wherein the link increases stiffness of said at least one member along the arc and decreases stiffness of said at least one member in other directions.

7. The apparatus of claim 6, wherein the link comprises an aerostatic bushing.

8. The apparatus of claim 6, further comprising:
   a set of bearings disposed between said tool mount and said actuator, said set of bearings providing stiffness in the axial direction while reducing stiffness along other directions.

9. The apparatus of claim 8, wherein said set of bearings comprise air bearings.

10. The apparatus of claim 4, further comprising:
    a spindle for supporting a workpiece; and
    an axial actuator for moving said spindle along the axial direction.

11. The apparatus of claim 10, further comprising:
    a controller for said actuator and said axial actuator.

12. The apparatus of claim 11, wherein said controller is configured to control said actuator and said axial actuator using forward and inverse kinematics.

13. The apparatus of claim 10, further comprising:
    a metrology system coupled to said base and disposed along an axial path of said spindle.

14. The apparatus of claim 10, wherein the apparatus comprises a micro-scale machining tool.

15. The apparatus of claim 10, further comprising:
    a tool disposed in said tool mount.

16. An apparatus for supporting a tool for use in hard turning, the apparatus comprising:
    means for supporting the apparatus;
    means for mounting a tool, said means for mounting being rotatably coupled to said means for supporting;
    means for actuating movement along a first distance;
    means for transferring actuated movement from said means for actuating to angular movement of said means for mounting over a second distance, said means for mounting being rotatably coupled to said means for actuating, said second distance being shorter than said first distance;
    means for rotatably supporting a workpiece; and
    means for moving the workpiece with respect to said means for mounting a tool, said means for moving being coupled to said means for supporting.

17. The apparatus of claim 16, further comprising:
    means for decoupling radial movement of said means for actuating from said means from said means for mounting, said means for decoupling being rotatably coupled to said means for supporting.

18. The apparatus of claim 17, further comprising:
    means for increasing axial stiffness for said means for supporting.

19. A method for machining a miniature workpiece, the method comprising:
    placing a tool into a tool mount of a micro-scale hard turning apparatus, the apparatus comprising a base, a pivot coupled to the base, an actuator rotatably coupled to the base, and at least one member rotatably coupled to the pivot at one end and rotatably coupled to the actuator at another end, the at least one member supporting the tool mount, wherein the at least one member defines a first lever arm between the pivot and the tool mount and a second lever arm between the pivot and the actuator, the first lever arm having a length that is less than a length of the second lever arm;

placing a workpiece into a spindle;

selectively rotating the spindle;

selectively moving the spindle along an axial direction; and selectively actuating the actuator to move the placed tool in an angular direction toward the spindle, wherein a distance traveled by the actuator is greater than a distance traveled by the placed tool.

20. The method of claim 19, wherein the actuator comprises a linear actuator;

and wherein said selectively actuating the linear actuator comprises controlling the linear actuator using forward and inverse kinematics.

* * * * *